United States Patent
Radke et al.

(10) Patent No.: US 9,353,275 B2
(45) Date of Patent: May 31, 2016

(54) INK VISIBLE UNDER NARROW BAND UV RADIATION

(75) Inventors: Garold E Radke, Lebanon, OR (US); Alexander Govyadinov, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1459 days.

(21) Appl. No.: 12/742,922

(22) PCT Filed: Nov. 14, 2007

(86) PCT No.: PCT/US2007/023804
§ 371 (c)(1),
(2), (4) Date: May 13, 2010

(87) PCT Pub. No.: WO2009/064267
PCT Pub. Date: May 22, 2009

(65) Prior Publication Data
US 2011/0080451 A1    Apr. 7, 2011

(51) Int. Cl.
| B41J 2/01 | (2006.01) |
| C09D 11/322 | (2014.01) |
| B41J 11/00 | (2006.01) |
| C09D 11/32 | (2014.01) |
| B41M 3/14 | (2006.01) |
| C09D 11/50 | (2014.01) |

(52) U.S. Cl.
CPC .............. C09D 11/322 (2013.01); B41J 11/002 (2013.01); B41M 3/144 (2013.01); C09D 11/32 (2013.01); C09D 11/50 (2013.01)

(58) Field of Classification Search
CPC .............. B41J 2/01; B41J 2/0057; B41J 2/05; B41J 2/1433; B41J 2/15; B41J 2/155; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41M 3/144; C09D 11/005; C09D 11/30; C09D 11/32; C09D 11/322; C09D 11/324; C09D 11/328; C09D 11/36; C09D 11/38; C09D 11/40; C09D 11/52; C09D 11/54; C09D 11/101

USPC .......... 347/95–102, 21, 28; 106/31.13–31.15, 106/31.6; 523/160, 161

See application file for complete search history.

(56) References Cited

U.S. PATENT DOCUMENTS

| 4,452,843 | A | 6/1984 | Kaule et al. |
| 5,554,842 | A | 9/1996 | Connell et al. |
| 5,569,317 | A | 10/1996 | Sarada et al. |
| 6,354,501 | B1 | 3/2002 | Outwater et al. |
| 6,835,326 | B2 | 12/2004 | Barbera-Guillem |
| 6,861,012 | B2 | 3/2005 | Gardner et al. |
| 6,905,538 | B2 | 6/2005 | Auslander |
| 2004/0253419 | A1 | 12/2004 | Bleikolm |
| 2005/0119368 | A1 | 6/2005 | Hall-Goulle et al. |
| 2005/0279248 | A1* | 12/2005 | Auslander .................. 106/31.28 |
| 2006/0012657 | A1 | 1/2006 | Nagashima et al. |
| 2006/0293409 | A1* | 12/2006 | Sanchez et al. ............... 523/160 |
| 2007/0138438 | A1 | 6/2007 | Hampden-Smith et al. |

FOREIGN PATENT DOCUMENTS

| EP | 1111026 | 6/2001 |
| EP | 1346839 | 9/2003 |

OTHER PUBLICATIONS

Schmechel, R., Luminescence properties of nanocrystalline Y2O3:Eu3+ in different host materials, AIP Journal of Applied Physics, Feb. 1, 2001, pp. 1679-1686, vol. 89. No. 3.

Schmechel, Luminescence properties of nanocrystalline Y2O3:Eu3+ in different host materials, J. Appl. Phys. vol. 89, No. 3, Feb. 1, 2001, 1679-1686.

Chinese Office Action for Application No. 200780101579.8, Applicant Hewlett-Packard Development Company. L.P., Aug. 2, 2012.

* cited by examiner

Primary Examiner — Matthew Luu
Assistant Examiner — Rut Patel
(74) Attorney, Agent, or Firm — Thorpe, North & Western L.L.P.

(57) ABSTRACT

An ink can be substantially invisible under most lighting conditions, and only visible when excited by UV energy having a wavelength specific to the colorant. The ink can include a liquid vehicle and a fluorescent colorant. The fluorescent colorant can have an average particle size of less than about 200 nm. Such ink can be configured as an ink-jet ink.

14 Claims, No Drawings

INK VISIBLE UNDER NARROW BAND UV RADIATION

BACKGROUND

For some time, there has been a desire to produce systems and methods that can offer a greater degree of document security. For example, documents often need to be marked as original, such as identification cards, passports, checks, and currency. Alternatively, documents may need to be marked with certain information that is preferably not visible under normal lighting conditions. For this purpose, specialized watermarks and printing techniques have been developed. Additionally, a variety of printing materials have been incorporated into such processes. Counterfeiting continues to advance along with the developments in providing more authentic and secure documents. Thus, there is a need to develop more techniques and materials that impart new and additional levels of authentication to documents and the like.

DETAILED DESCRIPTION

Reference will now be made to the exemplary embodiments of the present disclosure, both those described and those illustrated in the drawing, and specific language will be used herein to describe the same. It will nevertheless be understood that no limitation of the scope of the disclosure is thereby intended. Alterations and further modifications of the inventive features illustrated herein, and additional applications of the principles of the disclosure as illustrated herein, which would occur to one skilled in the relevant art and having possession of this disclosure, are to be considered within the scope of the disclosure.

In describing and claiming the present disclosure, the following terminology will be used.

The singular forms "a," "an," and "the" include plural referents unless the context clearly dictates otherwise. Thus, for example, reference to "a colorant" includes reference to one or more colorants.

The term "fluid" does not require that all components in the composition be liquid, as pigments are typically dispersed in the color-containing fluid. Thus, fluid dispersions and fluid solutions are both included as colorant-containing fluids. It is also noted that the term "colorant" in many embodiments includes materials that receive light outside of the visible spectrum, and reflect light within the visible spectrum.

The term "stable" when referring to an ink or other solution in the present application, refers to a dispersion including a plurality of particles where the particles remain dispersed in solution for an extended period of time under normal storage and/or usage conditions. Such conditions may be dependent on the purpose of the solution or ink, and are thus ink-specific. Non-limiting examples of times on which to base stability include greater than 1 week, greater than 1 month, greater than 6 months, greater than 1 year, and greater than 3 years.

As used herein, the term "hue" refers to a color within the visible spectrum. Both "hue" and "color" are used to indicate distinct colors. Technically, two different hues are distinguished as light is emitted or reflected from one hue at a wavelength that is different from a wavelength of the other hue.

The term "fluorescent colorant" as used herein, indicates a colorant that, when exposed to a non-visible wavelength of energy, emits or reflects a visible wavelength. Furthermore, the fluorescent colorants used herein, are substantially invisible except when exposed to the activating non-visible wavelength of energy. Non-limiting examples of fluorescent colorants include $(SrCaBaMg)_5(PO_4)_3Cl:Eu$, $LaPO_4:Ce$, $LaPO_4:Tb$, $Y_2O_3:Eu$, $Ca_{10}(PO_4)_6FCl:Sb$, $Ca_{10}(PO_4)_6FCl:Mn$, and combinations thereof. Additional non-limiting examples of colorants include halcogenides, e.g. MeS, MeSe; halogenides, e.g. BaFCl; oxides, e.g. $Y_2O_3$, $La_2O_3$, $Gd_2O_3$, $CaYBO_4$, $ScBO_2$, $YBO_3$, $LaBO_3$, $BaBO_3$, $CeBO_3$, $BaB_2O_4$; fluorides, e.g. $CaF_2$, $SrF_2$, $BaF_2$, $(LaAlCe)F_3$; borates; aluminates, e.g. $YAl_3B_4O_{12}$, $Y_3Al_5O_{12}$, $Y_4Al_2O_9$; silicates, e.g. $Sc_2Si_2O_7$, $Y_2SiO_5$, $Ce_2Si_2O_7$; phosphates, e.g. $YPO_4$, $LaPO_4$, $CePO_4$, $GdPO_4$; vanadates, e.g. $YVO_4$, $GdVO4$; aluminum yttrium garnets; gallium gadolinium garnets; oxihalides, e.g. YOCl, LaOCl, LaOBr; oxisulphades, e.g. $Y_2O_2S$; halc and even more complicated materials like lantanum stabilized a-SiAlON, particularly $LaAl(Si_{6-z}Al_z)N_{10-z}O_z:Ce^{3+}$ (for z=1 excitation at 350±100 nm, emission at 500±10 nm); similar materials and other combinations of noted materials.

The term "dopant" in relation to the colorant, refers to a material included with the fluorescent colorant which at least slightly alters the properties of the colorant. An atomic structure of doping elements should have excitation states relaxed to ground (main) state corresponding to visible light range. Typically all lantanoids with f-orbitals and d-transition metals like Cu, Ti, etc. satisfy these conditions. Concentration of a dopant may vary from 0 to about 1 atomic %. At high concentration of the dopant, energy coupling decreases intensity and increases emission band. Dopant material is typically indicated after a colon. For example, $Y_2O_3:Eu$ is yttrium oxide doped with europium. Dopants can be used to shift and narrow excitation band phosphors.

"UV" or "ultra violet" is defined as radiation with a wavelength ranging from about 10 nm to about 400 nm. UV radiation can be sub-divided into long wave or "blacklight" (about 315 nm to about or slightly greater than 380 nm), medium wave (about 280 to about 315 nm), and short wave (less than about 280 nm). Often, UV radiation can be utilized in accordance with embodiments of the present disclosure such that it is matched to the narrow range of fluorescence of a given fluorescent colorant. Thus, in one embodiment, by matching a narrow range of UV energy to a narrow range of fluorescing that occurs for a given colorant, an original document may be able to be authenticated, or provide some other benefit.

Additionally, as discussed herein, exposing a printed image or printed ink to UV radiation is meant to indicate exposure at a greater level to the UV radiation than is typically found in ambient light. For example, bringing the colorants or media near an energy source that emits UV light of the noted region is included in exposing the image to UV radiation. For example, taking the image or media into the sunlight or ambient light is not considered exposing the image or media to UV radiation having a wavelength of about 200 nm to about 280 nm, even though sunlight or ambient light includes such UV radiation.

The ink, and particularly the fluorescent colorant, e.g. yttrium oxide doped with europium ($Y_2O_3:Eu$), is said to absorb UV radiation and shift the wavelength of the UV radiation to a reflected visible wavelength. Although this is the terminology used to explain the phenomena of exciting the fluorescent colorant with UV energy and having the fluorescent colorant emit a visible wavelength, it is understood that other explanations or descriptions are equally as probable and/or valid so long as it indicates that the fluorescent colorant receives UV wavelength and, as a result, emits or reflects visible wavelength energy. For example, it could be said that the fluorescent colorant absorb non-visible radiation and emit a visible wavelength. Further, the fluorescent colorant could be said to fluoresce a visible color upon receiving a non-visible radiation.

The terms "light" and "radiation" can be used interchangeably and mean energy in the form of electromagnetic waves.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

According to various aspects of the present disclosure, an ink-jet ink, or a component thereof, can be substantially invisible under the majority of lighting and reproducing conditions. Such ink can be visible under a narrow band of energy. Specifically, the ink, or a component thereof, when printed on a media substrate, can be substantially invisible, meaning that under typical lighting circumstances, the ink or component will be invisible, or near to invisible to the unaided eye, except when excited by UV energy having a wavelength in a narrow range that is matched to the fluorescing range of a given colorant. As previously mentioned, exposing a printed image or printed ink to UV radiation of the noted specific range is meant to indicate exposure at a greater level to the UV radiation than is typically found in ambient light. Examples of this include bringing the colorants or media near an energy source that emits UV light of the noted region is included in exposing the image to UV radiation, or taking the image or media into the sunlight or ambient light is not considered exposing the image or media to UV radiation having a wavelength of about 200 nm to about 280 nm, even though sunlight or ambient light includes such UV radiation. When the ink-jet ink is exposed to adequate amounts radiation of the noted range which is more intense than is present in ambient light, it emits a red hue that is visible to the eye. Therefore, to verify the mark is present, or to view the printed image, a UV source that emits UV radiation having a wavelength of about 200 nm to about 280 nm would be directed to the printed ink, at which point a visible image would be visible to the eye. Such visible state is not permanent, and the image would remain visible only as long as activated by the necessary UV radiation. In one embodiment, a method or system may include the use or presence of a UV energy source that emits UV radiation only within the fluorescing range of the fluorescent colorant. The ink can include one or more fluorescent colorants. Such colorants are substantially insoluble in water, however, can form stable solutions and inks, based on careful selection of particle size, along with other ink components. Non-limiting examples of fluorescent colorants include $(SrCaBaMg)_5(PO_4)_3Cl:Eu$, $LaPO_4:Ce$, $LaPO_4:Tb$, $Y_2O_3:Eu$, $Ca_{10}(PO_4)_6FCl:Sb$, $Ca_{10}(PO_4)_6FCl:Mn$, and combinations thereof.

In one embodiment, the fluorescent colorant can comprise or consist essentially of $YVO_4:Sm^{3+}$, emitting at about 600 nm and about 650 nm; $YVO_4:Eu^{3+}$, emitting at about 610 nm; $YPO_4:Tb^{3+}$, emitting at about 545 nm; $YVO_4:Dy^{3+}$, emitting at about 570 nm; $YVO_4:Ho^{3+}$, emitting at about 545 nm and at about 570 nm; $YVO_4:Er^{3+}$, emitting at about 550 nm; and $YVO_4:Tm^{3+}$, emitting at about 475 nm. Additionally, dopants can be used with $Y_2O_3$. Inclusion of differing dopants can alter the excitation and emission peaks for each colorant. Non-limiting examples of dopants and related excitation and emission peaks include (with lower peaks indicating excitation, and higher peaks representing emission, and with primary peaks reported): Pr, 283 nm, 619 nm, 630 nm; Sm, 407 nm, 608 nm; Eu, 253 nm, 611 nm; Tb, 280 nm, 304 nm, 543.5 nm; Dy, 231 nm, 349.5 nm, 572.5 nm; Er, 380 nm, 563 nm; Ho, 362 nm, 448 nm, 550 nm; and Tm, 362 nm, 453 nm. Measurements represent a concentration of 0.1 mol % of dopant except for Er3+, which represents a 1 mol % concentration.

In a specific embodiment, the fluorescent colorant can comprise or consist of $Y_2O_3:Eu$. The fluorescent colorant can be present in any amount that can produce, when printed and exposed to appropriate non-visible energy, a visible image. In a specific embodiment, the fluorescent colorant can be present in a liquid vehicle at an amount from about 0.1 wt % to 3 wt %. The liquid vehicle can be aqueous or non-aqueous. The fluorescent colorant can have an average particle size of less than about 200 nm.

In accordance with the difficulties outlined, various details are provided herein which are applicable to each of the ink-jet ink, method, security marking, etc., and methods for making the same. Thus, discussion of one specific embodiment is related to and provides support for this discussion in the context of the other related embodiments. Additionally, for ease of discussion, the fluorescent colorant $Y_2O_3:Eu$ may be used exclusively in discussion. The use of the noted colorant is not to be taken as applications wherein only that colorant would work, rather the $Y_2O_3:Eu$ could, and should, be replace interchangeably with any fluorescent colorant having the requirements as outlined above. Therefore, discussion of $Y_2O_3:Eu$ and response to UV energy having a wavelength range of from about 200 nm to about 280 nm, is not to be taken as directed to $Y_2O_3:Eu$ only, but teaches each fluorescent colorant having a particle size of less than 200 nm, capable of forming a stable solution, and responsive to energy in the form of a narrow range, in conjunction with the fluorescent colorants responsive narrow range.

Specifically, an ink jet ink can comprise a liquid vehicle, and a fluorescent colorant in the form of substantially insoluble particles having an average particle size of less than about 200 nm. The ink-jet ink can be configured such that, when printed on a media substrate, the portion of the fluorescent colorant in the ink jet ink can produce a visible image that is substantially invisible except when excited by a specific UV energy having a range of not greater than about 80 nm and specific to the fluorescent colorant. In a further embodiment, the ink jet ink can be substantially free of other non-fluorescent coloring agents. In the case of $Y_2O_3:Eu$, the fluorescent colorant portion of the ink-jet ink can be substantially invisible except when excited by UV energy having a wavelength from about 200 nm to about 280 nm.

In another embodiment, a method of making an ink-jet ink can comprise blending a fluorescent colorant having a particle size of less than 200 nm to create a dispersion, and blending from about 1 wt % to about 5 wt % of the dispersion with a liquid vehicle to form a stable ink. In a specific embodiment, the dispersion can have a pH of about 6 to about 7.

In another embodiment, a method of printing and illuminating a selectively-visual image can comprise printing an ink on a media substrate, wherein the ink includes a liquid vehicle and $Y_2O_3$:Eu. Another step includes exposing the printed image to UV energy having a wavelength from about 200 nm to about 280 nm. The $Y_2O_3$:Eu can have an average particle size of less than about 200 nm, and the ink can be substantially free of other non-fluorescent agents. When the ink is printed on a media substrate, the ink or the fluorescent colorant portion can be substantially invisible except when excited by UV energy having a wavelength in the range corresponding to the fluorescent colorant. In one embodiment, though not required, UV energy can be used that is only within the fluorescing range of the colorant. In this manner, document authentication may occur.

In still another embodiment, a security marking can comprise an image including 0.1 μg/cm² to 50 μg/cm² $Y_2O_3$:Eu, wherein the $Y_2O_3$:Eu has an average particle size of less than about 200 nm. In a further embodiment, a security marking can comprise an image including 0.1 μg/cm² to 5 μg/cm² $Y_2O_3$:Eu, wherein the $Y_2O_3$:Eu has an average particle size of less than about 200 nm. These images can be substantially free of other photoluminescent agents, and the security markings can also be substantially invisible except when excited by UV energy having a wavelength from about 200 nm to about 280 nm.

$Y_2O_3$:Eu can provide the highly-selective visual marking of the ink, meaning an ink, including yttrium oxide doped with europium is visible only under select circumstances, i.e. when exposed to radiation of about 200 nm to about 280 nm. To create an image, the $Y_2O_3$:Eu can be included in a variety of vehicles or used in various ways. In a particular embodiment, inks and/or liquid toners having $Y_2O_3$:Eu which is capable of absorbing non-visible radiation of a narrow band and shifting the wavelength to a reflected visible wavelength can be applied to some type of media, e.g., coated media sheets, transparencies, etc. One method of applying the colorant-containing fluids to media can be ink-jet printing. The $Y_2O_3$:Eu is substantially invisible under many lighting conditions because of the relative emission intensities. Emission intensity is roughly 100 times greater for $Y_2O_3$:Eu when excited with radiation having a wavelength of about 254 nm as compared to $Y_2O_3$:Eu when excited with radiation having a wavelength of about 365 nm. This unique property of $Y_2O_3$:Eu accounts for the ink being substantially invisible under lighting conditions outside of the narrow range of about 200 nm to about 280 nm. Normal lighting, e.g. office lighting, conditions does not supply the intensity of UV radiation in the 200 nm to 280 nm range sufficient to cause the $Y_2O_3$:Eu to shift the wavelength to a reflected visible wavelength that is significantly detectable to the naked eye. Thus the $Y_2O_3$:Eu can be used to produce an ink that is substantially invisible except when subjected to UV radiation of a narrow band.

To improve the qualities of the ink, both ink performance characteristics, and printed image quality, the fluorescent colorant, e.g. $Y_2O_3$:Eu, can have an average particle size of less than about 200 nm. In a more detailed embodiment, the average particle size can be less than about 150 nm. In still a further detailed embodiment, the average particle size can be less than about 100 nm. Such particle sizes, depending on other components in the inks, allow for the creation of stable inks. The concentration of europium in yttrium oxide is typically measured in mole percent. As such, the $Y_2O_3$:Eu of the present application can have a concentration of europium in yttrium oxide from about 1 mole percent to about 3 mole percent. In a further embodiment, the concentration of europium in yttrium oxide can be about 2 mole percent.

In some cases, it may be beneficial to use $Y_2O_3$:Eu of a smaller particle size. For example, the potential use of the ink, ink additives, etc., may, in some cases, work well with $Y_2O_3$:Eu of smaller particle size. Therefore, in one aspect, the average particle size of the $Y_2O_3$:Eu can be less than about 150 nm. In a more specific aspect, the $Y_2O_3$:Eu can have an average particle size of less than about 100 nm.

The $Y_2O_3$:Eu described herein can be utilized to produce images that are activated by specific non-visible radiation. Accordingly, a method for printing a selectively-visual image can include printing an ink of the present disclosure on a media substrate. The ink can include an aqueous liquid vehicle and yttrium oxide doped with europium. The $Y_2O_3$:Eu can be present at about 0.1 wt % to 3 wt % and can have an average particle size of less than about 200 nm. The ink can be substantially free of other non-fluorescent coloring agents. Therefore, the printed ink can be substantially invisible except when excited by UV energy having a wavelength from about 200 nm to about 280 nm. The method can further include exposing the printed image to UV energy having a wavelength from about 200 nm to about 280 nm. In an embodiment, the method of printing can include ink jetting an ink on a media substrate.

In one embodiment, the ink can include $Y_2O_3$:Eu as the only coloring agent. In such cases, the non-$Y_2O_3$:Eu coloring agents of the present disclosure that are excluded from the ink formulation can include any standard or non-standard type of coloring agent not excluding dyes and pigments. Further, such coloring agents can be activated with visible or non-visible radiation, i.e. UV or IR, and can include colorants such as, fluorescent colorants, phosphorescent colorants, etc. In another embodiment, the ink can include non-$Y_2O_3$:Eu coloring agents, including any of the above-noted types of coloring agents.

Regarding the liquid vehicle that is present in some embodiments, in one aspect, the vehicle can be aqueous or can be non-aqueous. In one embodiment, the vehicle can include at least one co-solvent. Such co-solvent can be present in the liquid vehicle at about 1 wt % to about 50 wt %. In a more specific embodiment, the co-solvent can be present at about 1 wt % to about 50 wt %, and more typically, from about 1 wt % to about 20 wt %.

Classes of co-solvents that can be used separately or in combination include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. Specific examples of co-solvents that can be used include trimethylolpropane, 2-pyrrolidone, and 1,5-pentanediol. In a specific embodiment, the co-solvent can comprise or consist essentially of 2-pyrrolidone.

The liquid vehicle can include one or more surfactants. Specifically, the liquid vehicle can include one or more nonionic, cationic, and/or anionic surfactants, and if present, can be included at from about 0.01 wt % to about 5.0 wt %. One or more of many surfactants can be used as are known by those skilled in the art of ink formulation and may include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. Non-limiting examples of surfactants that can be used include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof. Fluorosurfactants can also be used such as those previously known in the art.

Other ink components known in the art such as biocides, viscosity modifiers, materials for pH adjustment, sequestering agents, preservatives, latexes, polymers, and the like, can also be present. Regarding the other additives that can be included in the liquid vehicle formulations, it is understood that the enumerated components are exemplary and do not limit the scope of vehicle components that can be used. For example, in some embodiments of the present disclosure, it may be favorable for the liquid vehicle to comprise water-soluble organic solvents or other co-solvents, and other additives as part of the liquid medium. The balance of any embodiment formulation can be purified water, or other vehicle component known in the art.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of the ink as desired. Such additives can be present at from 0.01% to 20% by weight.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of antioxidants, and evaporation accelerators. pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Additionally, solids (either dissolved in the liquid vehicle or dispersed therein) can also be present in the formulations of the present disclosure, and can include binders, other latex particulates, plasticizers, etc.

Media substrates can be any base material that can be plain or coated and is configured to receive ink in accordance with an embodiment of the present disclosure. A non-limiting example of a media substrate is paper. Such paper or other media substrates can be coated substrates, such as polymeric coated substrates, swellable media, or micro-porous media. In the example of paper, the paper can in some embodiments be photo paper, and can have a surface finish such as gloss, matte, or semi-gloss.

In one embodiment, the security marking can be on a media substrate. In one aspect, when the image is excited with UV energy having a wavelength from about 200 nm to about 280 nm, e.g. about 254 nm, the image can reflect a red hue. Such reflected hue, in one embodiment, can be a very narrow emission peak.

Many counterfeiting and duplication involves the use of consumer owned scanning and/or copy equipment. The inks of the present application can be used to create security markings wherein the image is not detectable with a consumer-marketed scanner or copy machine. Such images can be extremely useful as they can greatly reduce the level of counterfeiting. Furthermore, such images can be difficult to detect because the image would have to be exposed to not just UV light, but to a narrow and specific range of UV light, and therefore, may be overlooked by would-be counterfeiters. Many scanner and copy machines will typically cause visible emission for compounds that excite at wavelengths below about 400 nm. For colorants that excite below this threshold, a visible indication of presence would not appear when copied or scanned under normal circumstances. Such is the case with $Y_2O_3$:Eu, which excites at a wavelength far below the 400 nm threshold.

Under some circumstances, a UV light source may provide effective amounts of UV radiation, e.g. in the about 200 nm to about 280 nm range, as part of radiation of a broad range. Applications of this technology do not end with security, though. Printing and the resulting images of this type can be used to produce unique versions of any printed material. In one aspect, the image can be used as a game or part of a game, such as a game piece (e.g. with secret decoding aspects). Further, such images can be useful in décor as with posters and artwork.

Inks and security markings according to the present disclosure are substantially invisible except when excited by UV energy having a wavelength corresponding to an excitation wavelength for the colorant. In one non-limiting example, the wavelength can be from about 200 nm to about 280 nm. In a specific embodiment, the UV energy can have a wavelength from about 240 to about 265 nm. Excitement in the range of 200 nm to 280 nm can produce a narrow emission peak, which can allow for additional levels of security, particularly when combined with spectral readers to verify the security marking.

EXAMPLES

The following examples illustrate embodiments of the disclosure that are presently known. Thus, these examples should not be considered as limitations of the present disclosure, but are merely in place to teach how to make the best-known compositions of the present disclosure based upon current experimental data. As such, a representative number of compositions and their method of manufacture are disclosed herein.

Example 1

Preparation of $Y_2O_3$:Eu Dispersion 4 g of $Y_2O_3$:Eu is ground in a media mill for 2 hours in 100 mL of water at a pH of 6.7. At the end of milling, the $Y_2O_3$:Eu has an average particle size of less than 200 nm. This particle size can be confirmed by laser diffraction particle size analysis.

Example 2

Preparation Of Ink Jet Ink 2 wt % of the dispersion of Example 1 is blended into an aqueous mixture with 8 wt % 2-pyrrolidone and 0.05 wt % surfactant to form a stable (i.e. shelf-stable over a period of time consistent with industry standards) ink-jet ink.

Example 3

Fluorescence Of Ink-Jet Ink

The ink-jet ink of Example 2 is printed on a media substrate. Under ambient light, the ink-jet ink is substantially invisible. Upon irradiation with UV energy ranging from 200 nm to 280 nm, the ink-jet ink is illuminated and becomes humanly visible.

While the disclosure has been described with reference to certain preferred embodiments, those skilled in the art will appreciate that various modifications, changes, omissions, and substitutions can be made without departing from the spirit of the disclosure. It is therefore intended that the disclosure be limited only by the scope of the appended claims.

What is claimed is:

1. A stable ink jet ink, comprising:
a liquid vehicle; and
a fluorescent colorant in the form of substantially water insoluble particles having an average particle size of less than about 200 nm,
wherein when the ink jet ink is printed on a media substrate, the fluorescent colorant in the ink jet ink is substantially invisible except when excited within a narrow range UV energy that is specific to the fluorescent colorant, the narrow range being no greater than about 80 nm.

2. An ink-jet ink as in claim 1, wherein the fluorescent colorant is selected from $(SrCaBaMg)_5(PO_4)_3Cl$:Eu, $LaPO_4$:Ce, $LaPO_4$:Tb, $Y_2O_3$:Eu, $Ca_{10}(PO_4)_6FCl$:Sb, $Ca_{10}(PO_4)_6FCl$:Mn, and combinations thereof.

3. An ink jet ink as in claim 2, wherein the fluorescent colorant includes $Y_2O_3$:Eu, and the ink jet ink produces a visible image that is substantially invisible except when excited by UV energy having a wavelength ranging from 200 nm to 280 nm.

4. An ink jet ink as in claim 3, wherein the concentration of Eu in the $Y_2O_3$:Eu is from about 1 mole percent to about 3 mole percent.

5. An ink-jet ink as in claim 3, wherein the visible image is at least 100 times greater than a visible image excited outside the wavelength range of 200 nm to 280 nm.

6. An ink-jet ink as in claim 1, wherein the ink jet ink is substantially free of other non-fluorescent coloring agents, and the ink jet ink produces a visible image that is substantially invisible except when excited by UV energy having a wavelength ranging from 200 nm to 280 nm.

7. An ink-jet ink as in claim 1, wherein the fluorescent colorant has an average particle size of less than about 150 nm.

8. An ink-jet ink as in claim 1, wherein the fluorescent colorant has an average particle size of less than about 100 nm.

9. A system for printing and illuminating a selectively-visual image, comprising:
(a) a media substrate;
(b) an ink jet ink, comprising:
(i) a liquid vehicle, and
(ii) a fluorescent colorant in the form of substantially water insoluble particles having an average particle size of less than about 200 nm, wherein when the ink-jet ink is printed on the media substrate, the fluorescent colorant in the ink-jet ink is substantially invisible except when excited using a narrow range UV energy that is specific to the fluorescent colorant, the narrow range being no greater than about 80 nm; and
(c) a UV energy source configured to emit UV energy only within the narrow range.

10. A system as in claim 9, wherein the fluorescent colorant is selected from $(SrCaBaMg)_5(PO_4)_3Cl$:Eu, $LaPO_4$:Ce, $LaPO_4$:Tb, $Y_2O_3$:Eu, $Ca_{10}(PO_4)_6FCl$:Sb, $Ca_{10}(PO_4)_6FCl$:Mn, and combinations thereof.

11. A system as in claim 10, wherein the fluorescent colorant includes $Y_2O_3$:Eu, and the ink jet ink produces a visible image that is substantially invisible except when excited by UV energy having a wavelength ranging from 200 nm to 280 nm, and wherein the UV energy source is configured to emit UV energy only within the range of 200 nm to 280 nm.

12. A system as in claim 9, wherein the ink jet ink is substantially free of other non-fluorescent coloring agents, and the ink jet ink produces a visible image that is substantially invisible except when excited by UV energy having a wavelength ranging from 200 nm to 280 nm, and wherein the UV energy source is configured to emit UV energy only within the range of 200 nm to 280 nm.

13. A method of printing and illuminating a selectively-visual image, comprising:
(a) printing an ink on a media substrate, the ink including:
(i) a liquid vehicle, and
(ii) a fluorescent colorant in the form of substantially water insoluble particles having an average particle size of less than about 200 nm, wherein when the ink-jet ink is printed on the media substrate, the fluorescent colorant in the ink-jet ink is substantially invisible except when excited within a narrow range UV energy that is specific to the fluorescent colorant, the narrow range being no greater than about 80 nm; and
(b) exposing the printed image to UV energy having a wavelength that is only within the narrow range of UV energy.

14. A method as in claim 13, wherein the step of printing is by ink-jetting.

* * * * *